United States Patent
Li et al.

(10) Patent No.: US 11,481,945 B1
(45) Date of Patent: Oct. 25, 2022

(54) ANIMATION EFFECT ATTACHMENT BASED ON AUDIO CHARACTERISTICS

(71) Applicant: Lemon Inc., Grand Cayman (KY)

(72) Inventors: Yunzhu Li, Los Angeles, CA (US); Chen Sun, Los Angeles, CA (US); Gamze Inanc, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/353,455

(22) Filed: Jun. 21, 2021

(51) Int. Cl.
  *G06T 13/20* (2011.01)
  *G06T 13/80* (2011.01)
  *G10H 1/36* (2006.01)
  *G06T 17/20* (2006.01)

(52) U.S. Cl.
  CPC ............ *G06T 13/205* (2013.01); *G06T 13/80* (2013.01); *G06T 17/20* (2013.01); *G10H 1/368* (2013.01)

(58) Field of Classification Search
  None
  See application file for complete search history.

(56) References Cited

PUBLICATIONS

Wen et al., "Photorealistic Audio driven Video Portraits", IEEE, Dec. 2020. (Year: 2020).*

* cited by examiner

*Primary Examiner* — Nicholas R Wilson
(74) *Attorney, Agent, or Firm* — Faegre Drinker Biddle & Reath LLP

(57) ABSTRACT

Systems and methods for rendering a video effect to a display are described. More specifically, video data and audio data are obtained. The video data is analyzed to determine one or more attachment points of a target object that appears in the video data. The audio data is analyzed to determine audio characteristics. A video effect associated with an animation to be added to the one or more attachment points is determined based on the audio characteristics. A rendered video is generated by applying the video effect to the video data.

17 Claims, 9 Drawing Sheets

ANIMATION EFFECT ATTACHMENT BASED ON AUDIO CHARACTERISTICS

BACKGROUND

Video editing techniques are widely available to provide users various way to edit videos. For example, the users may edit a video to add a visual effect and/or music to the video. However, many of the video editing techniques do not consider controlling the visual effect based on audio data. Hence, there remains a need to develop video editing techniques for rendering video effect synchronization to enhance the user experience.

It is with respect to these and other general considerations that the aspects disclosed herein have been described. Also, although relatively specific problems may be discussed, it should be understood that the examples should not be limited to solving the specific problems identified in the background or elsewhere in this disclosure.

SUMMARY

In accordance with at least one example of the present disclosure, a method for rendering a video effect to a display is provided. The method includes obtaining video data and audio data, analyzing the video data to determine one or more attachment points of a target object that appears in the video data, analyzing the audio data to determine audio characteristics, determining a video effect associated with an animation to be added to the one or more attachment points based on the audio characteristics, and generating a rendered video by applying the video effect to the video data.

In accordance with at least one example of the present disclosure, a computing device for rendering a video effect to a display is provided. The computing device may include a processor and a memory having a plurality of instructions stored thereon that, when executed by the processor, causes the computing device to obtain video data and audio data, analyze the video data to determine one or more attachment points of a target object that appears in the video data, analyze the audio data to determine audio characteristics, determine a video effect associated with an animation to be added to the one or more attachment points based on the audio characteristics, and generate a rendered video by applying the video effect to the video data.

In accordance with at least one example of the present disclosure, a non-transitory computer-readable medium storing instructions for rendering a video effect to a display is provided. The instructions when executed by one or more processors of a computing device, cause the computing device to obtain video data and audio data, analyze the video data to determine one or more attachment points of a target object that appears in the video data, analyze the audio data to determine audio characteristics, determine a video effect associated with an animation to be added to the one or more attachment points based on the audio characteristics, and generate a rendered video by applying the video effect to the video data.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
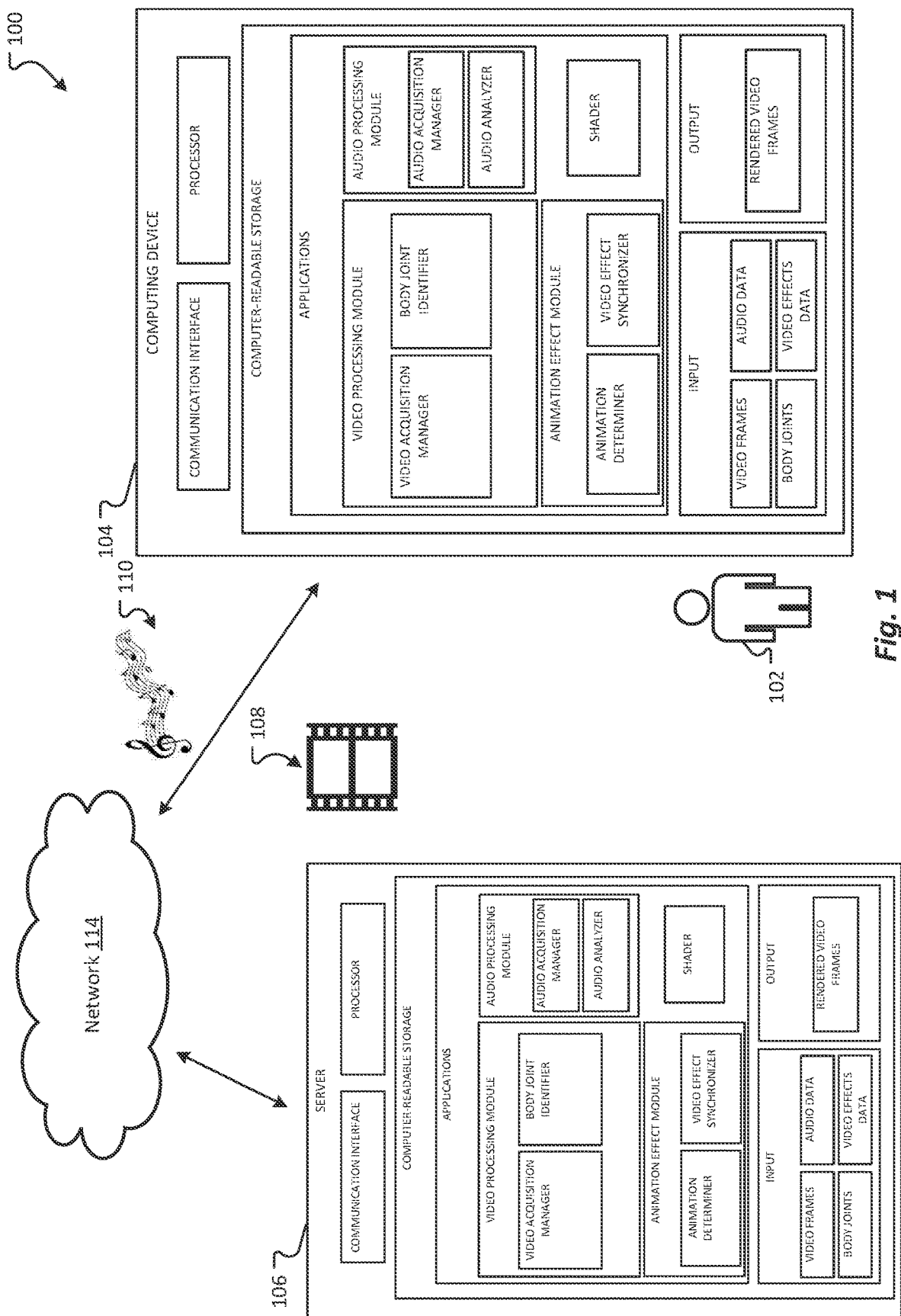
FIG. 1 depicts an example video effect synchronization system in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, a video effect synchronization system allows a user to apply audio-reactive video effects to one or more attachment points in a video clip. For example, the user may choose a video effect from a video effect library to add animation to the video clip. The video effect may be defined by one or more video effect parameters associated with the animation. As an example, the video effect parameters may include, but are not limited to, one or more animated objects to be added to the video clip, one or more attachment points for each animated object in the video clip, and one or more animation effects to be applied to each animated object. It should be appreciated that the animated object may include multiple visual elements.

In the illustrative aspect, the one or more attachment points may be one or more body joints of a target object appears and/or is tracked in the video clip. To do so, body joint identification may be performed to separate or identify a list of body joints from one or more target subjects of the video clip. As an example, the attachment points of the animated object may be determined based on music characteristics of audio music in the video clip. Alternatively, the attachment points may be preselected or predefined by the selected video effect.

Additionally, the one or more animation effects to be applied to the animated object may also be determined based on the music characteristics (e.g., beat information and/or frequency information) of the audio music. To do so, music characterization may be performed to determine the music characteristics of the audio music. Alternatively, if the audio music was selected by the user from a music library, the music characteristics may be embedded in the audio music as metadata. As an example, the animation effect may include a glow effect, and a color of a glow around the animated object may change based on the corresponding beat characteristics or frequency spectrum of the audio music. Accordingly, the one or more video effect parameters may be periodically (e.g., every beat) updated based on the audio music and the video clip. The video effect synchronization allows the animation reacting to the music beat of the audio music to be attached to one or more body joints of the target subject in the video clip.

FIG. 1 depicts a video effect synchronization system 100 for rendering one or more video effects in accordance with examples of the present disclosure. For example, a user 102 may generate, receive, acquire, or otherwise obtain a video clip 108. Subsequently, the user may select audio music 110 to be added to the video clip 108. The video effect synchronization system 100 allows the user 102 to create an audio-reactive video effect that is attached to one or more target body joints of a target subject in the video clip 108 based on the music 110. To do so, the video effect synchronization system 100 includes a computing device 104 associated with the user 102 and a server 106 that is communicatively coupled to the computing device 104 via a network 114. The network 114 may include any kind of computing network including, without limitation, a wired or wireless local area network (LAN), a wired or wireless wide area network (WAN), and/or the Internet.

In examples, the user 102 may utilize the computing device 104 to acquire the video clip 108 and the music 110. The user 102 may generate the video clip 108 using a camera communicatively coupled to a computing device 104. In such an example, the video effect may be synchronized to the music 110 in or near real-time to allow the user 102 to view the video effect around the one or more body joints on a display (e.g., a display 705) as the user is taking the video on the computing device 104. Alternatively, or additionally, the user 102 may receive, acquire, or otherwise obtain the video clip 108 on the computing device 104. In some examples, the user 102 may edit the video clip 108 to add the video effect based on the music 110. In some aspects, the user 102 may utilize the computing device 104 to transmit the video clip 108 and the music 110 to the server 106 via the network 114. The computing device 104 may be any one of a portable or non-portable computing device. For example, the computing device 104 may be a smartphone, a laptop, a desktop, a server. The video clip 108 may be acquired in any format and may be in a compressed and/or decompressed form.

The computing device 104 is configured to analyze each frame of the video clip 108 to identify body joints of one or more target subjects in the frame. For example, a body joint algorithm may define a list of body joints that are to be identified and extracted from the video clip 108. The body joints may include, but not limited to, a head, neck, pelvis, spine, right/left shoulder, right/left upper arm, right/left forearm, right/left hand, right/left thigh, right/left leg, right/left foot, and right/left toe.

The computing device 104 is configured to receive audio music 110 selected by the user 102 to be added to the video clip 108 from a music library. Alternatively, in some aspects, the audio music 110 may be associated with the video effect. In such aspects, the video effect may include default music to be added to the video clip 108. In some aspects, the audio music 110 may be extracted from the video clip 108. The computing device 104 is configured to analyze the audio data to determine beat information or frequency spectrum information of the audio music 110. For example, as described above, the computing device 104 may determine beat characteristics of each beat through an automatic beat tracking algorithm. It should be appreciated that, in some aspects, the music beat characterization may be embedded in the music as metadata. The music beat characterization may include a number and relative positions of accented and unaccented beats of the audio music 110. For example, if the audio music 110 has a 4/4 beat structure, each section has four beats with different beat intensity: strong beat, weak beat, second strong beat, and weak beat.

Alternatively, or additionally, the computing device 104 may determine frequency spectrum characterization of the audio music. For example, the computing device 104 may determine an average frequency spectrum for every beat of the audio music. It should be appreciated that, in some aspects, the frequency spectrum characterization may be embedded in the music as metadata.

The video effect includes video effect parameters that control a behavior of one or more animated objects that are to be added to one or more attachment points of the video data. In some aspects, the video effect parameters may define, but are not limited to, an animated object, one or more attachment points (e.g., one or more body joints of a target object) of the animated object, and an animation effect for the animated object to be added to one or more attachment points the video clip. In the illustrative aspect, the parameters of the video effect may be periodically (e.g., every beat) updated based on the audio music and the video clip. In other words, the video effect synchronization allows animation reacting to a music beat to be attached to a particular target object in the video clip.

In some aspects, the user may choose a video effect to be applied to the video clip 108 to attach an animated object to one or more body joints with a particular animation effect defined by the video effect parameters. The video effect parameters are configured to control which animated object is being added to which attachment points in the video clip and/or which animation effect is to be applied to the animated object. In other words, the video effect parameters define one or more body joints that the animated object is being attached to, how the one or more body joints are selected for video effect application throughout the video clip, and one or more animation effects to be applied to the animated object. For example, the video effect may be applied to a particular set of body joints randomly throughout the video clip. Alternatively, the video effect may be applied to the video clip in a particular sequence (e.g., head to toe). Alternatively, the animation effect may be applied to a particular body joint based on a beat intensity of the music. For example, if the audio music has a 4/4 beat structure, the pelvis may be assigned to a strong beat (e.g., FIG. 3A), the right and left thighs may be assigned to a weak beat (e.g., FIG. 3B), and the right and left feet may be assigned to a second strong beat (e.g., FIG. 3C). Alternatively, the animation effect may be determined based on the frequency spectrum range. For example, the pelvis may be assigned to a high spectrum range (e.g., 4 kHz-20 Hz), the right and left thighs may be assigned to a medium spectrum range (e.g., 500 Hz-4 kHz), and the right and left feet may be assigned to a low spectrum range (e.g., 20 Hz-500 Hz). In other words, the beat or spectrum of the audio music may control where the animation is being attached to the video clip.

In addition, the music characteristics of the audio music may also control one or more animation effects to be applied to the animated object. For example, the animation effect may include a glowing effect, in which case, the video effect parameters may control a color and/or an intensity of the glow emitted from the animated object. Accordingly, the computing device 104 may determine a glow color and/or intensity of the animation effect based on the beat characteristics. For example, if the audio music has a 4/4 beat structure, a high glow intensity may be assigned to a strong beat, a low glow intensity may be assigned to a weak beat, and a medium glow intensity may be assigned to a second strong beat.

Alternatively, the glow color and/or intensity of the animation effect may be determined based on the frequency spectrum range. For example, the high glow intensity may be assigned to a high spectrum range (e.g., 4 kHz-20 Hz), the medium glow intensity may be assigned to a medium spectrum range (e.g., 500 Hz-4 kHz), and the low glow intensity may be assigned to a low spectrum range (e.g., 20 Hz-500 Hz).

Additionally, or alternatively, an animation speed of the animation effect may be controlled based on the beat characteristics or the frequency spectrum range. For example, a fast animation speed may be assigned to the strong beat and/or the high spectrum range, a medium animation speed may be assigned to the second strong beat and/or the medium spectrum range, and a low animation speed may be assigned to the weak beat and/or the low spectrum range.

Once the video effect is ready to be added to the video clip, the computing device 104 may modify an animation sequence to blend a two-dimensional (2D) texture of the animated object in a three-dimensional (3D) mesh around the attachment points. The layering and blending of the 2D animated object on the 3D mesh may create a 3D-like animation effect. Subsequently, the computing device 104 may synchronize the video effect to the music beat of the audio music to generate a rendered video with the video effect, which may be presented to the user on a display (e.g., a display 705) that is communicatively coupled to the computing device 104. It should be appreciated that the video effect may be synchronized to the music beat in or near real-time to allow the user to view the video effect around the one or more body joints on the display as the user is taking the video. Alternatively, or additionally, the video effect may be synchronized to the music beat by the server 106. In such aspects, the video effect may be applied to the video clip 108 once the video clip 108 is uploaded to the server 106 to render the video effect.

Figure 2:
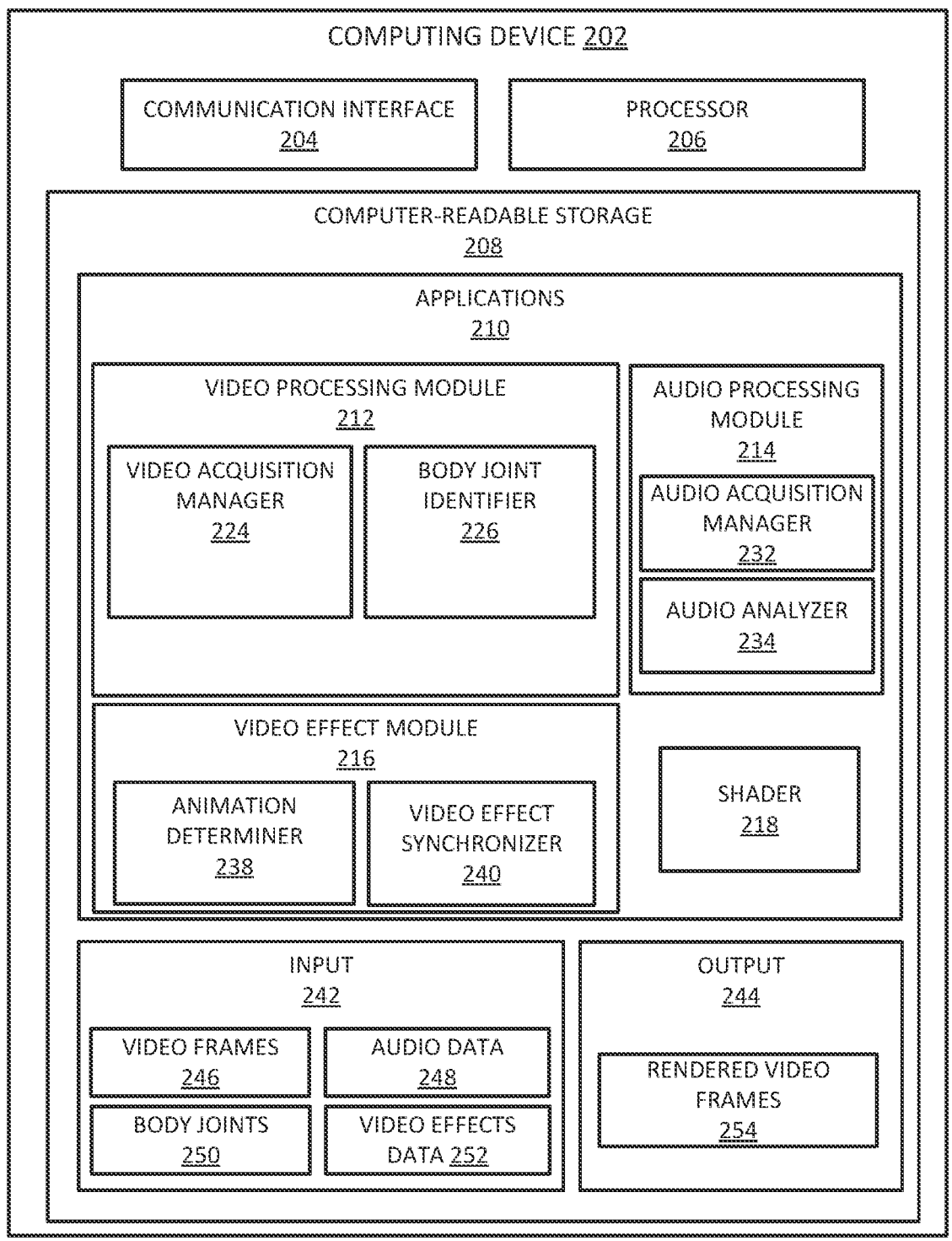
FIG. 2 depicts details of a computing device of the video effect synchronization system of FIG. 1 in accordance with examples of the present disclosure.

Referring now to FIG. 2, the computing device 202 in accordance with examples of the present disclosure is described. The computing device 202 may be the same as or similar to the computing device 104 previously described in FIG. 1. The computing device 202 may include a communication interface 204, a processor 206, and a computer-readable storage 208. In examples, the communication interface 204 may be coupled to a network and receive the video clip 108 and the audio music 110 (FIG. 1). The video clip 108 (FIG. 1) may be stored as video frames 246 and the music 110 may be stored as audio data 248.

In some examples, one or more video effects may also be received at the communication interface 204 and stored as the video effects data 252. The video effects data 252 may include one or more video effect parameters associated with the video effect. The video effect parameters may define, but are not limited to, one or more animated objects to be added to the video clip, one or more attachment points in the video clip where an animated object is to be attached to, and one or more animation effects to be applied to each animated object.

In examples, one or more applications 210 may be provided by the computing device 104. The one or more applications 210 may include a video processing module 212, an audio processing module 214, a video effect module 216, and a shader 218. The video processing module 212 may include a video acquisition manager 224 and a body joint identifier 226. The video acquisition manager 224 is configured to receive, acquire, or otherwise obtain video data that includes one or more video frames. Additionally, the body joint identifier 226 is configured to identify one or more body joints of one or more target subjects in the frame. In the illustrative aspect, the target subject is a person. For example, a body segmentation algorithm may define a list of body joints that are to be identified and extracted from the video clip 108. The body joints may include, but not limited to, a head, neck, pelvis, spine, right/left shoulder, right/left upper arm, right/left forearm, right/left hand, right/left thigh, right/left leg, right/left foot, and right/left toe. In some examples, the list of body joints may be received at the communication interface 204 and stored as the body joints 250. In some aspects, the list of body joints may be received from a server (e.g., 106).

Additionally, the audio processing module 214 may include an audio acquisition manager 232 and an audio analyzer 234. The audio acquisition manager 232 is configured to receive, acquire, or otherwise obtain audio data. The audio analyzer 234 is configured to determine audio information of the audio data. For example, the audio information may include, but is not limited to, beat information and frequency spectrum information of each beat of the audio data. As an example, an automatic beat tracking algorithm may be used to determine the beat information. In some aspects, the beat information may be already embedded in the audio data as metadata. In other aspects, the beat information may be received at the communication interface 204 and stored as the audio data 248. The beat information provides beat characteristics of each beat. The beat characteristics include, but not limited to, a beat structure, a repeating sequence of strong and weak beats, a number of accented and unaccented beats, and relative positions of accented and unaccented beats. For example, if the audio music has a 4/4 beat structure, each section has four beats with different beat intensity: strong beat, weak beat, second strong beat, and weak beat. Additionally, frequency spectrum information may be extracted from the audio data every predetermined time period (e.g., every beat). In some aspects, the frequency spectrum information may be already embedded in the audio data as metadata. In other aspects, the frequency spectrum information may be received at the communication interface 204 and stored as the audio data 248.

Furthermore, the video effect module 216 may further include an animation determiner 238 and a video effect synchronizer 240. The animation determiner 238 is configured to determine a video effect to be applied to the video data based on the audio data. Specifically, the animation determiner 238 is configured to determine one or more video effect parameters. For example, the animation determiner 238 is configured to determine one or more animated objects to be added to the video clip and one or more attachment points for each animated object. It should be appreciated that the animated object may include multiple visual elements and have multiple attachment points defined in the video clip. In the illustrative aspect, a target attachment point is a body joint of a target subject appears and/or is tracked in the video clip.

Additionally, as described further below, the animation determiner 238 is further configured to determine one or more animation effects to be applied to each animated object. In the illustrative aspect, the animation effect may change with every beat. In other words, the beat of the selected audio music may control the visual change of the video effect on the one or more body joints. For example, the animation effect may include a glowing effect, in which case, the animation determiner 238 may determine a color and/or an intensity of glow emitted from the animated object. In some aspects, the color and/or the intensity of glow may depend on the audio music that is being added to the video clip.

The animation determiner 238 may further determine one or more attachment points (e.g., body joints) in the video clip where the animated object is adapted to be attached to. In some aspects, the animation determiner 238 may determine that the video effect is to be applied to a particular set of body joints randomly throughout the video clip. Alternatively, the animation determiner 238 may determine that the video effect is to be applied to the video clip in a particular sequence (e.g., from top to bottom). Alternatively, the animation determiner 238 may determine that the video effect is to be applied to a particular body joints based on the beat intensity of the music. For example, if the audio music has a 4/4 beat structure, the pelvis may be assigned to a strong beat (e.g., FIG. 3A), the right and left thighs may be assigned to a weak beat (e.g., FIG. 3B), and the right and left feet may be assigned to a second strong beat (e.g., FIG. 3C). Alternatively, the attachment points may be determined based on the frequency spectrum range. For example, pelvis may be assigned to a high spectrum range (e.g., 4 kHz-20 Hz), right and left thighs may be assigned to a medium spectrum range (e.g., 500 Hz-4 kHz), and right and left feet may be assigned to a low spectrum range (e.g., 20 Hz-500 Hz). In other words, the beat or spectrum of the audio music may control what particular body joint the animation is being attached to the video clip.

The video effect synchronizer 240 is configured to synchronize the video effect to the music beat of the selected audio music to generate a rendered video with the video effect. In some aspects, the video effect synchronizer 240 is configured to modify an animation sequence to blend a 2D texture of the animated object in the 3D mesh around the attachment points. It should be appreciated that the layering and blending of the 2D animated object on the 3D mesh may create a 3D-like animation effect.

The video effect synchronizer 240 includes or otherwise is in communication with the shader 218. The shader 218 is configured to receive the video effect parameters. Based on the video effect parameters, the shader 218 is configured to generate or otherwise cause the effect to be rendered. For example, the shader 218 may change a visual effect associated with the video effect which may include, but is not limited to, producing blur, light bloom, (e.g., glow), lighting (e.g., shadows, highlights, and translucency), bump mapping, and distortion.

Figure 3A:
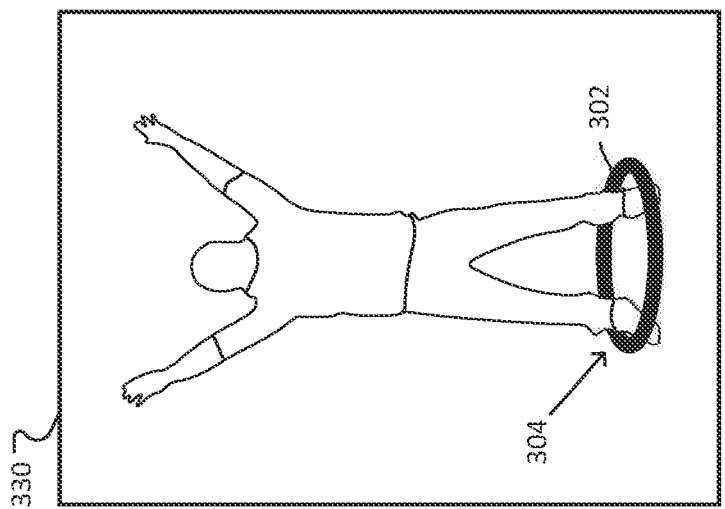
FIGS. 3A-3C depict example frames of a video rendered with video effect.
Figure 3B:
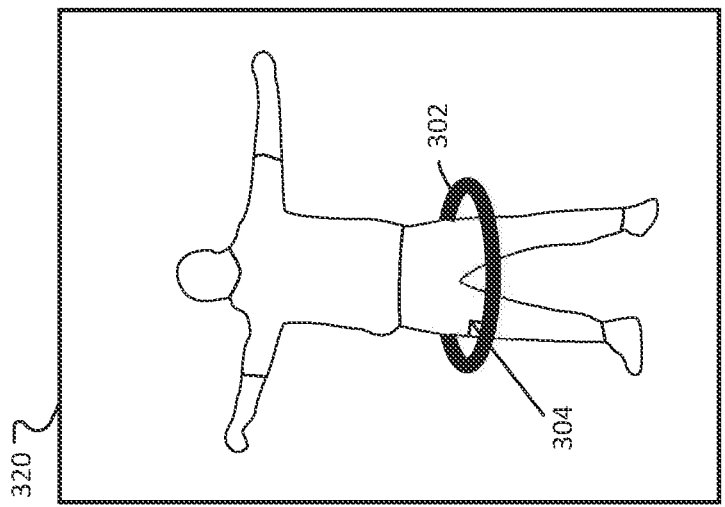
Figure 3C:
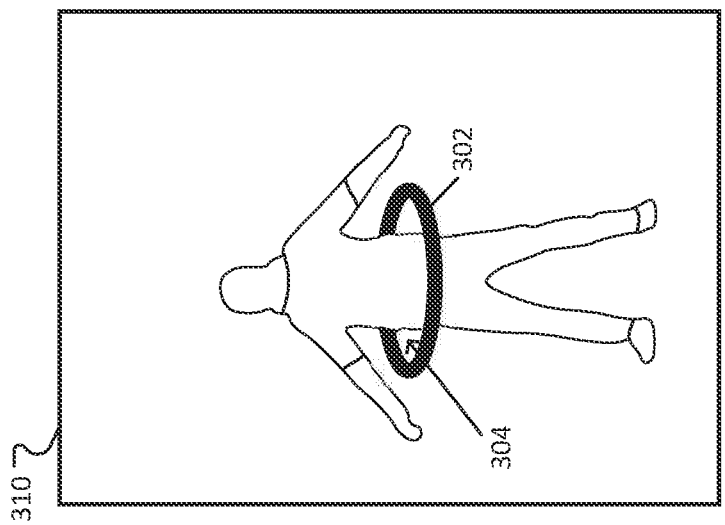

FIGS. 3A-3C illustrate exemplary video frames 310, 320, 330 of a video clip with video effect synchronization in accordance with examples of the present disclosure. In the illustrative example, an animation 302 (e.g., an animated object) attached to different attachment points 304 are shown.

In examples, upon receiving audio data to be added to the video clip, audio information (e.g., beat characteristics and/or frequency spectrum) of the audio data may be determined for every predetermined time period (e.g., a music beat). Based on the audio information, one or more attachment points 304 for the animation 302 may be determined. For example, if the audio music has a 4/4 beat structure, a pelvis may be assigned to a strong beat (e.g., FIG. 3A), right and left thighs may be assigned to a weak beat (e.g., FIG. 3B), and right and left feet may be assigned to a second strong beat (e.g., FIG. 3C). In such embodiments, the animation 302 is attached to the pelvis at the strong beat as shown in FIG. 3A, the right and left thighs at the weak beat as shown in FIG. 3B, and the right and left feet at the second strong beat as shown in FIG. 3C.

Alternatively, the animation effect may be determined based on the frequency spectrum range. For example, the pelvis may be assigned to a high spectrum range (e.g., 4 kHz-20 Hz), the right and left thighs may be assigned to a medium spectrum range (e.g., 500 Hz-4 kHz), and the right and left feet may be assigned to a low spectrum range (e.g., 20 Hz-500 Hz). In other words, the beat or spectrum of the audio music controls what particular body joint the animation is being attached to the video clip.

Figure 4:
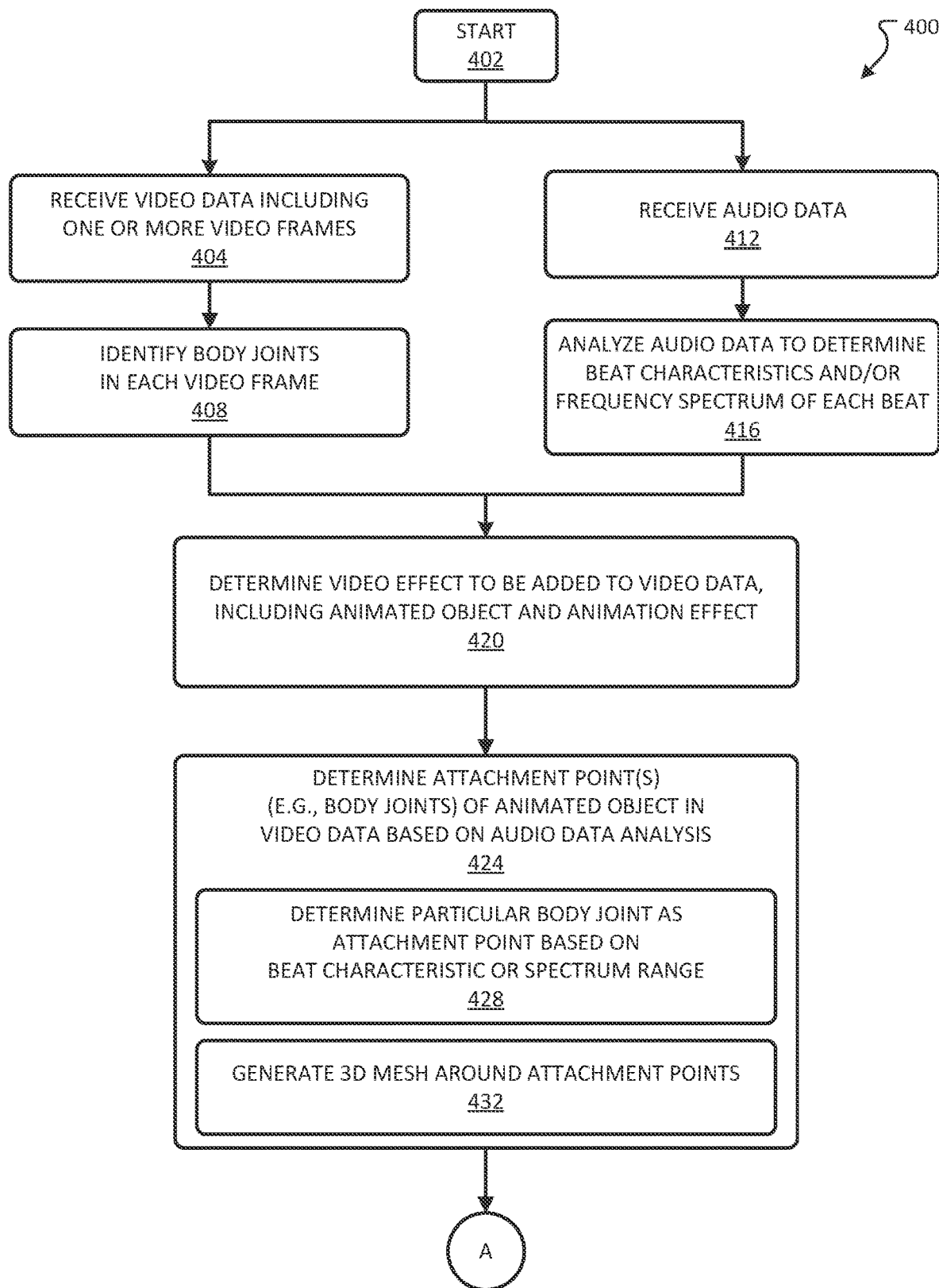
FIGS. 4 and 5 depict details of a method for rendering video effect in accordance with examples of the present disclosure.

Referring now to FIG. 4, a simplified method for rendering one or more video effects to video data based on audio data in accordance with examples of the present disclosure is described. A general order for the steps of a method 400 is shown in FIG. 4. Generally, the method 400 starts at 402 and ends at 460. The method 400 may include more or fewer steps or may arrange the order of the steps differently than those shown in FIG. 4. The method 400 can be executed as a set of computer-executable instructions executed by a computer system and encoded or stored on a computer readable medium. In the illustrative aspect, the method 400 is executed by a computing device associated with a user (e.g., 102). However, it should be appreciated that aspects of the method 400 may be performed by one or more processing devices, such as a computer or server (e.g., 104, 106). Further, the method 400 can be performed by gates or circuits associated with a processor, Application Specific Integrated Circuit (ASIC), a field programmable gate array (FPGA), a system on chip (SOC), a neural processing unit, or other hardware device. Hereinafter, the method 400 shall be explained with reference to the systems, components, modules, software, data structures, user interfaces, etc. described in conjunction with FIGS. 1 and 2.

The method 400 starts at 402, where flow may proceed to 404. At 404, the computing device receives video data (e.g., video clip 108) including one or more video frames. For example, a user 102 may generate, receive, acquire, or otherwise obtain a video clip 108 via the computing device. At 408, the computing device processes each frame of the video data to identify body joints of one or more target subjects in the frame. For example, a body joint algorithm may define a list of body joints that are to be identified and extracted from the video clip 108. The body joints may include, but not limited to, a head, neck, pelvis, spine, right/left shoulder, right/left upper arm, right/left forearm, right/left hand, right/left thigh, right/left leg, right/left foot, and right/left toe.

Referring back to the start 402, the method 400 may proceed to 412. It should be appreciated that the computing device may perform the operations 404 and 412 simultaneously. Alternatively, the operation 412 may be performed subsequent to the operation 404. In some aspects, the operation 404 may be performed subsequent to the operation 412.

At 412, the computing device receives audio data (e.g., audio music 110) selected by the user 102 to be added to the video data. Subsequently, at 416, the computing device analyzes the audio data to determine audio information of the audio music 110. For example, the audio information includes beat characteristics and/or frequency spectrum of each beat. In some aspects, the computing device may determine beat characteristics of each beat through an automatic beat tracking algorithm. The beat characteristics include, but not limited to, a beat structure, a repeating sequence of strong and weak beats, a number of accented and unaccented beats, and relative positions of accented and unaccented beats. For example, if the audio music 110 has a 4/4 beat structure, each section has four beats with different beat intensity: strong beat, weak beat, second strong beat, and weak beat. In other aspects, the computing device may determine a frequency of each beat to associate with a particular frequency range (e.g., high range, medium range, and low range).

Once the video data and the audio data are received and analyzed in operations 404-416, the method 400 proceeds to 420. At 420, the computing device determines a video effect to be added to the video data. For example, the user may choose a video effect from a video effect library to add animation to a video clip. The video effect is defined by video effect parameters that control which animated object is being added to which attachment points in the video clip. It should be appreciated that the animated object may include multiple visual elements and have multiple attachment points in the video clip. Additionally, as described further below, the video effect parameters further control one or more animation effects to be applied to the animated object.

At 424, the computing device determines one or more attachment points of the animated object to be added in the video clip based on the audio data analysis performed in operation 416. As described above, the animation attachment point is a body joint of a target subject appears and/or is tracked in the video clip. For example, at 428, the computing device determines a particular body joint as the animation attachment point based on a beat characteristic. For example, if the audio music has a 4/4 beat structure, the pelvis may be assigned to a strong beat (e.g., FIG. 3A), the right and left thighs may be assigned to a weak beat (e.g., FIG. 3B), and the right and left feet may be assigned to a second strong beat (e.g., FIG. 3C). Alternatively, the animation attach points may be determined based on the frequency spectrum range. For example, the pelvis may be assigned to a high spectrum range (e.g., 4 kHz-20 Hz), the right and left thighs may be assigned to a medium spectrum range (e.g., 500 Hz-4 kHz), and the right and left feet may be assigned to a low spectrum range (e.g., 20 Hz-500 Hz). In other words, the beat or spectrum of the audio music controls what particular body joint the animation is being attached to the video clip.

Figure 5:
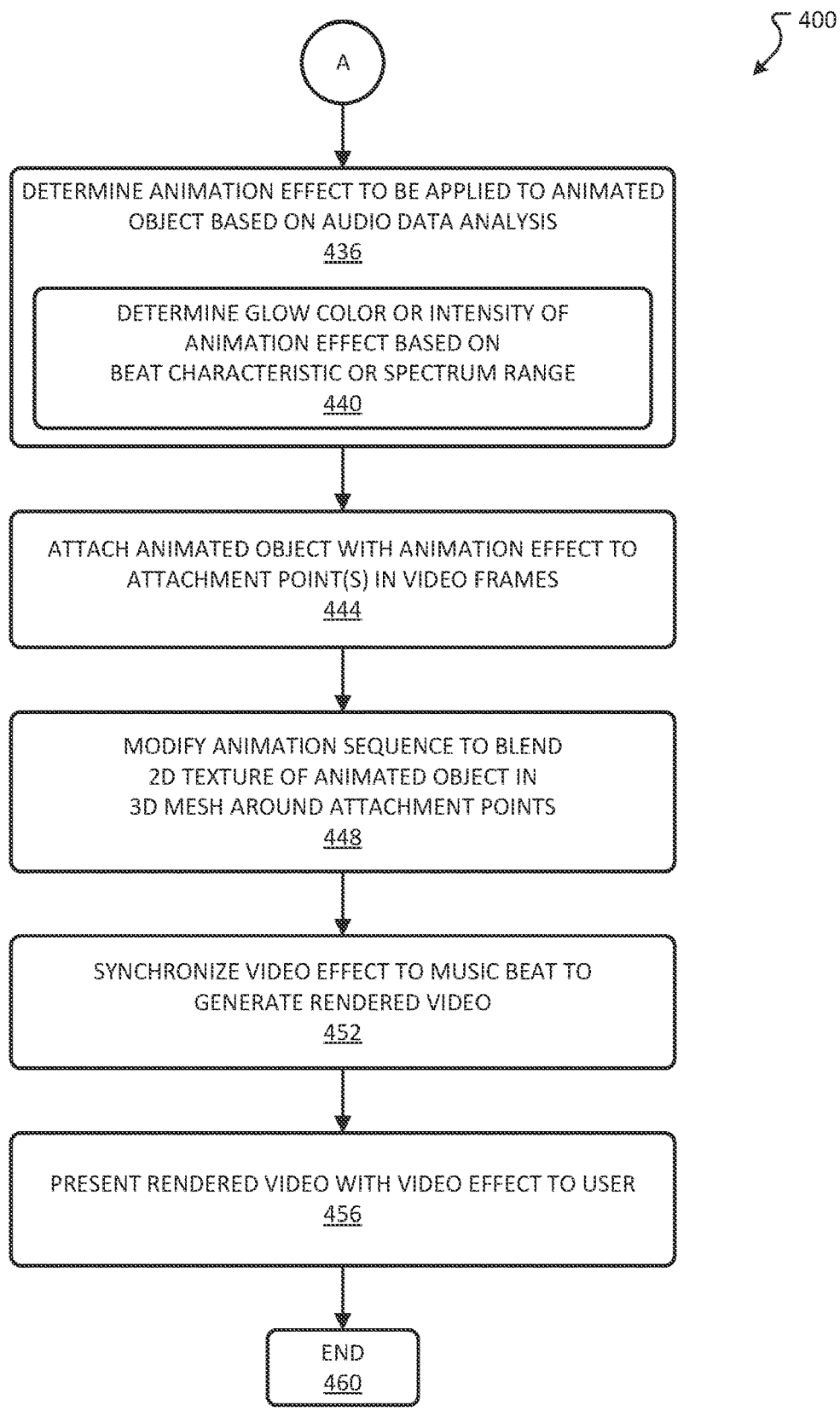

Additionally, at 432, the computing device generates a three-dimensional (3D) mesh around each of the one or more attachment points of the animated object in the video data. As described further below, the 3D mesh is used to attach the animated object (e.g., a two-dimensional (2D) animated object) to the corresponding attachment points. Subsequently, the method 400 proceeds to 436 in FIG. 5 as shown by the alphanumeric character A in FIGS. 4 and 5.

At 436, the computing device determines one or more animation effects to be applied to the animated object based on the audio data analysis performed in operation 416. For example, the animation effect may include a glowing effect, in which case, the video effect parameters may control a color and/or an intensity of glow emitted from the animated object. Accordingly, at 440, the computing device may determine a glow color and/or intensity of the animation effect based on the beat characteristics. For example, if the audio music has a 4/4 beat structure, a high glow intensity may be assigned to a strong beat, a low glow intensity may be assigned to a weak beat, and a medium glow intensity may be assigned to a second strong beat.

Alternatively, the glow color and/or intensity of the animation effect may be determined based on the frequency spectrum range. For example, the high glow intensity may be assigned to a high spectrum range (e.g., 4 kHz-20 Hz), the medium glow intensity may be assigned to a medium spectrum range (e.g., 500 Hz-4 kHz), and the low glow intensity may be assigned to a low spectrum range (e.g., 20 Hz-500 Hz).

Additionally, or alternatively, an animation speed of the animation effect may be controlled based on the beat characteristics and/or the frequency spectrum range. For example, a fast animation speed may be assigned to the strong beat and/or the high spectrum range, a medium animation speed may be assigned to the second strong beat and/or the medium spectrum range, and a low animation speed may be assigned to the weak beat and/or the low spectrum range.

Once the animated object and the corresponding animation effect(s) are determined, the method 400 proceeds to operation 444. At 444, the computing device attaches the animated object with its corresponding animation effect(s) to the one or more corresponding attachment points in the video frames. In other words, the animation is attached to one or more target body joints throughout the video clip based on the audio data.

Subsequently, or simultaneously, at 448, the computing device modifies an animation sequence to blend a 2D texture of the animated object in the 3D mesh that was generated around the attachment points. The layering and blending of the 2D animated object on the 3D mesh may create a more 3D-like animation effect.

Subsequently, at 452, the video effect is synchronized to the music beat or spectrum of the selected audio music to generate a rendered video with the video effect. At 456, the computing device presents the rendered video with the video effect to the user on a display (e.g., a display 705). It should be appreciated that the video effect may be synchronized to the music beat in or near real-time to allow the user to view the video effect around the one or more body joints on a display (e.g., a display 705) as the user is taking the video. The method may end at 460.

It should be appreciated that, although the method 400 is described to be performed by the computing device associated with the user, one or more operations of the method 400 may be performed by any computing device or server, such as the server 106. For example, the synchronization of the video effect to the music beat may be performed by the server, which receives the music and the video clip from the computing device associated with a user.

Figure 6:
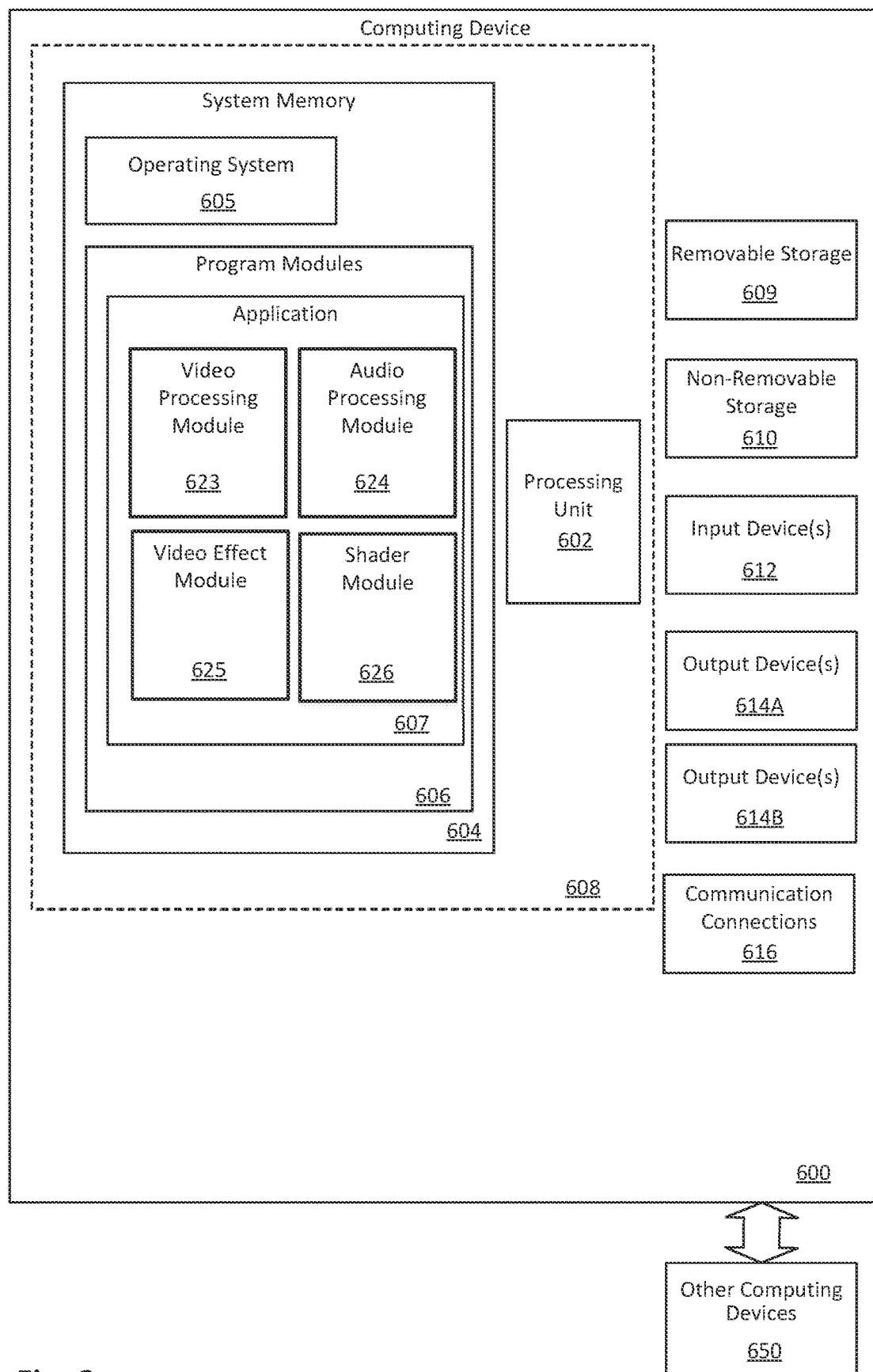
FIG. 6 depicts a block diagram illustrating physical components (e.g., hardware) of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above. For example, the computing device 600 may represent the computing device 104 of FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, several program modules and data files may be stored in the system memory 604. While executing on the at least one processing unit 602, the program modules 606 may perform processes including, but not limited to, one or more aspects, as described herein. The application 620 includes a video processing module 623, an audio processing module 624, a video effect module 625, and a shader module 626, as described in more detail with regard to FIG. 1. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614A such as a display, speakers, a printer, etc. may also be included. An output 614B, corresponding to a virtual display may also be included. The aforementioned devices are examples and others may be used. The computing device 600 may include one or more communication connections 616 allowing communications with other computing devices 450. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
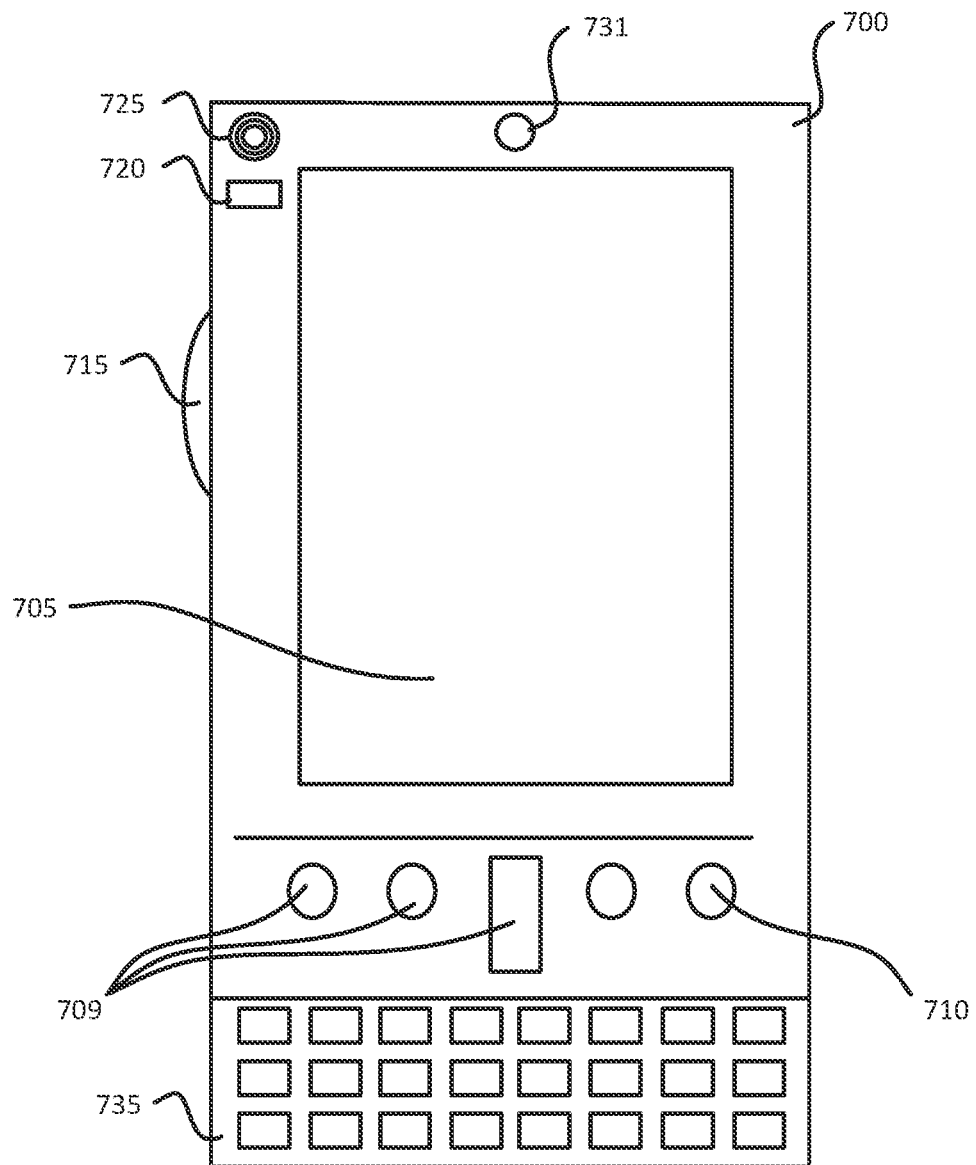
FIG. 7A illustrates a first example of a computing device with which aspects of the disclosure may be practiced.
Figure 7B:
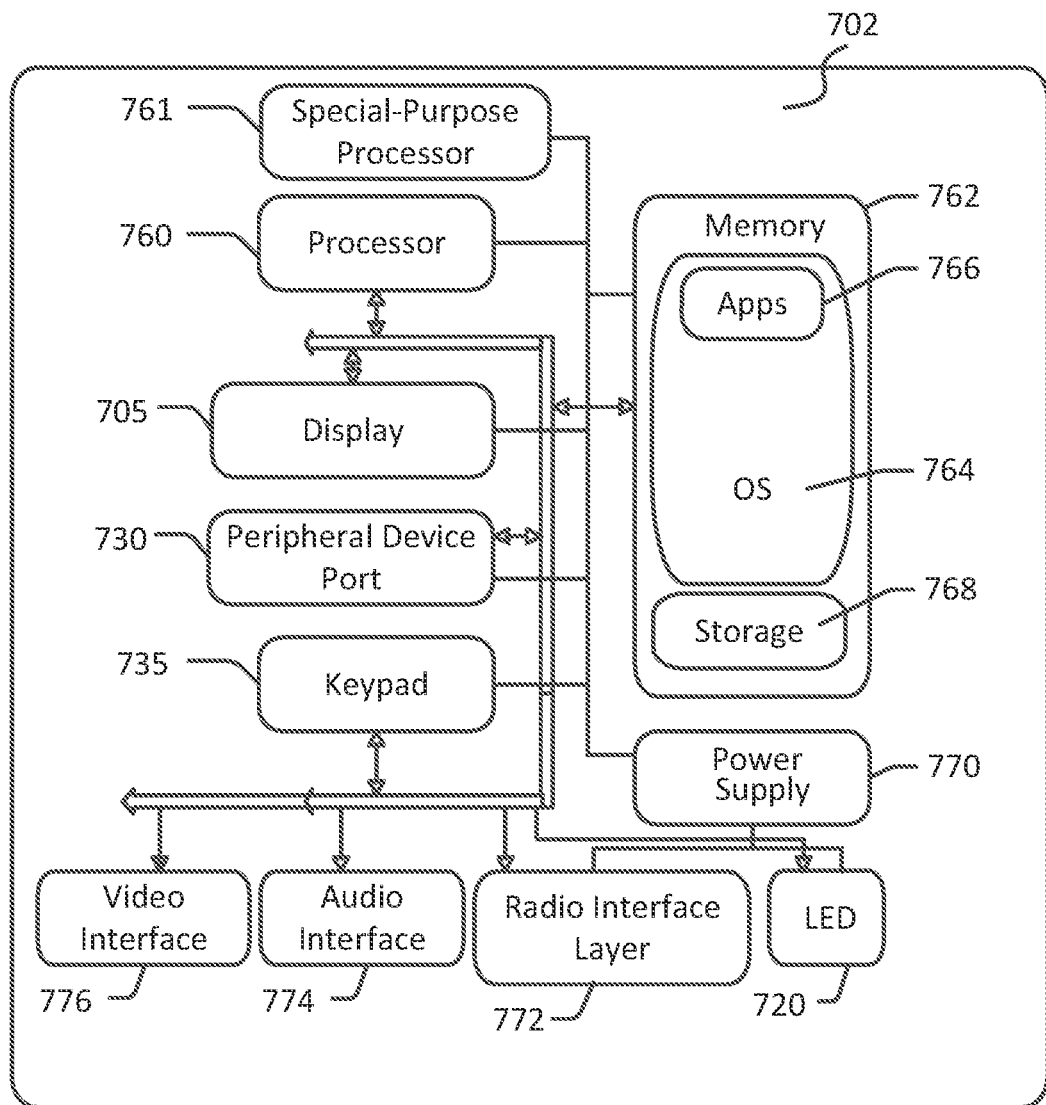
FIG. 7B illustrates a second example of a computing device with which aspects of the disclosure may be practiced.

FIGS. 7A and 7B illustrate a computing device or mobile computing device 700, for example, a mobile telephone, a smart phone, wearable computer (such as a smart watch), a tablet computer, a laptop computer, a smart home appliance, and the like, with which aspects of the disclosure may be practiced. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 709/710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 731 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports 730, such as an audio input (e.g., a microphone jack), an audio output (e.g., a headphone jack), and a video output (e.g., a HDMI port) for sending signals to or receiving signals from an external source.

FIG. 7B is a block diagram illustrating the architecture of one aspect of computing device, a server, or a mobile computing device. That is, the mobile computing device 700 can incorporate a system (602) (e.g., an architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and/or one or more components supported by the systems described herein. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g. a video processing module 623, an audio processing module 624, a video effect module 625, and a shader module 626, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760/761 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of an on-board camera to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
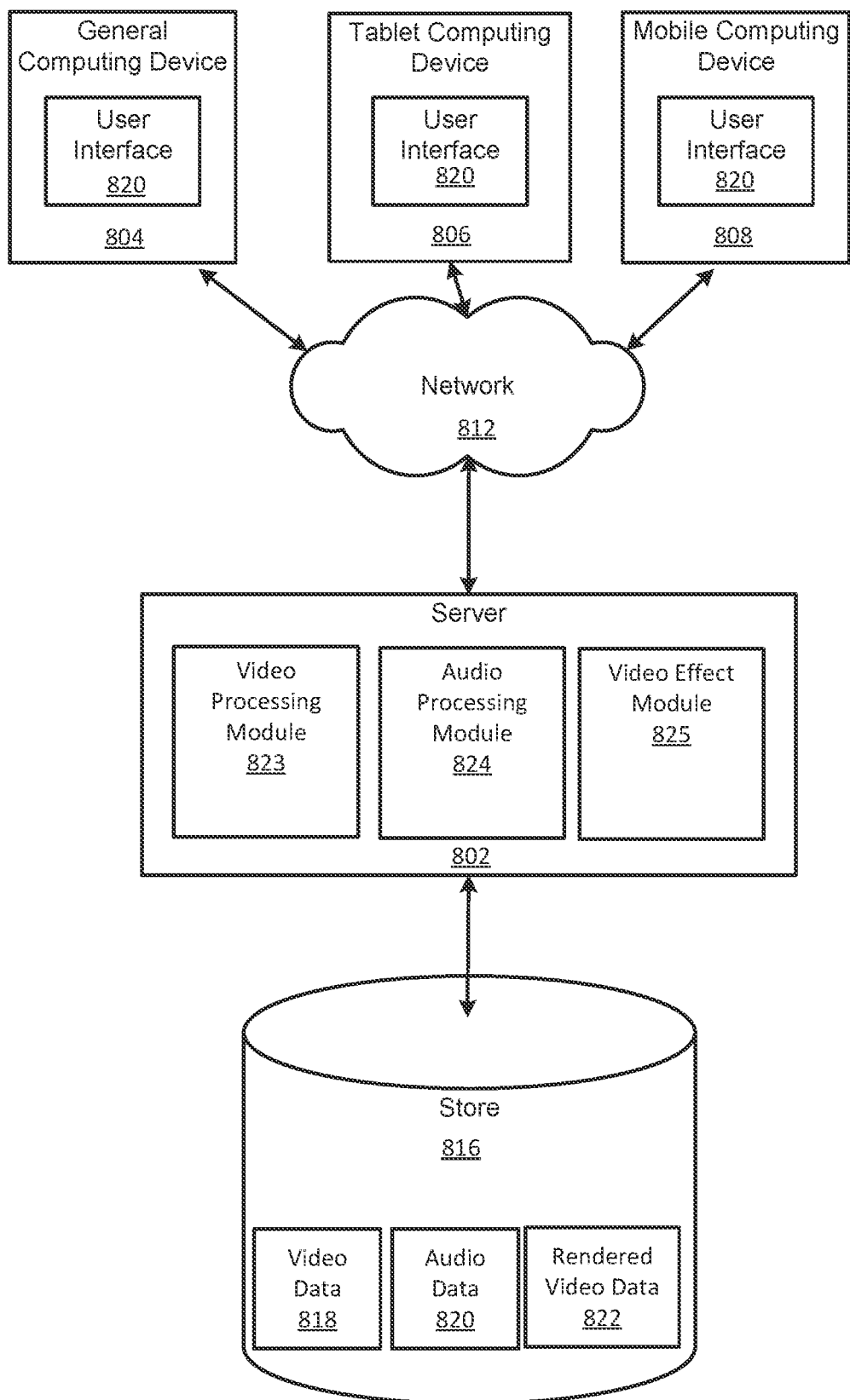
FIG. 8 illustrates at least one aspect of an architecture of a system for processing data in accordance with examples of the present disclosure.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, the computing device 804, 806, 808 may represent the computing device 104 of FIG. 1, and the server device 802 may represent the server 106 of FIG. 1.

In some aspects, one or more of a video processing module 823, an audio processing module 824, and a video effect module 825, may be employed by server device 802. The server device 802 may provide data to and from a client computing device such as a personal computer 804, a tablet computing device 806 and/or a mobile computing device 808 (e.g., a smart phone) through a network 812. By way of example, the computer system described above may be embodied in a personal computer 804, a tablet computing device 806 and/or a mobile computing device 808 (e.g., a smart phone). Any of these aspects of the computing devices may obtain content from the store 816, in addition to receiving graphical data useable to be either pre-processed at a graphic-originating system, or post-processed at a receiving computing system. The content store may include video data 818, audio data 820, and rendered video data 822.

FIG. 8 illustrates an exemplary mobile computing device 808 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

(A1) In one aspect, some examples include a method for rendering a video effect to a display. The method includes obtaining video data and audio data, analyzing the video data to determine one or more attachment points of a target object that appears in the video data, analyzing the audio data to determine audio characteristics, determining a video effect associated with an animation to be added to the one or more attachment points based on the audio characteristics, and generating a rendered video by applying the video effect to the video data.

(A2) In some examples of A1, wherein determining the video effect associated with the animation to be added to the one or more attachment points based on the audio characteristics comprises determining an animated object to be added to the one or more attachment points, determining the one or more attachment points in the video data where the animated object is to be attached, and determining one or more animation effects to be applied to the animated object based on the audio characteristics.

(A3) In some examples of A1-A2, wherein the one or more attachment points are selected from one or more body points of the target object that appears in the video data.

(A4) In some examples of A1-A3, wherein determining the one or more attachment points in the video data comprises determining one or more attachment points in the video data based on the audio characteristics.

(A5) In some examples of A1-A4, the method further includes generating a three-dimensional (3D) mesh around the one or more attachment points and modifying an animation sequence to blend the animated object in a corresponding 3D mesh around the one or more attachment points where the animated object is attached.

(A6) In some examples of A1-A5, wherein the audio characteristics comprises beat characteristics of each beat or a frequency spectrum value for each beat.

(A7) In some examples of A1-A6, wherein obtaining the audio data comprises selecting the audio data from a music library, and wherein the audio characteristics are embedded in the audio data as metadata.

In yet another aspect, some examples include a computing system including one or more processors and memory coupled to the one or more processors, the memory storing one or more instructions which when executed by the one or more processors, causes the one or more processors perform any of the methods described herein (e.g., A1-A7 described above).

In yet another aspect, some examples include a non-transitory computer-readable storage medium storing one or more programs for execution by one or more processors of a storage device, the one or more programs including instructions for performing any of the methods described herein (e.g., A1-A7 described above).

(B1) In one aspect, some examples include a computing device for rendering a video effect to a display. The computing device may include a processor and a memory having a plurality of instructions stored thereon that, when executed by the processor, causes the computing device to obtain video data and audio data, analyze the video data to determine one or more attachment points of a target object that appears in the video data, analyze the audio data to determine audio characteristics, determine a video effect associated with an animation to be added to the one or more attachment points based on the audio characteristics, and generate a rendered video by applying the video effect to the video data.

(B2) In some examples of B1, wherein to determine the video effect associated with animation to be added to the one or more attachment points based on the audio characteristics comprises to determine an animated object to be added to the one or more attachment points, determine the one or more attachment points in the video data where the animated object is to be attached, and determine one or more animation effects to be applied to the animated object based on the audio characteristics.

(B3) In some examples of B1-B2, wherein the one or more attachment points are selected from one or more body points of the target object that appears in the video data.

(B4) In some examples of B1-B3, wherein to determine the one or more attachment points in the video data comprises to determine one or more attachment points in the video data based on the audio characteristics.

(B5) In some examples of B1-B4, the plurality of instructions, when executed, further cause the computing device to generate a three-dimensional (3D) mesh around the one or more attachment points and modify an animation sequence to blend the animated object in a corresponding 3D mesh around the one or more attachment points where the animated object is attached.

(B6) In some examples of B1-B5, wherein the audio characteristics comprises beat characteristics of each beat or a frequency spectrum value for each beat.

(B7) In some examples of B1-B6, wherein to obtain the audio data comprises to select the audio data from a music library, and wherein the audio characteristics are embedded in the audio data as metadata.

(C1) In one aspect, some examples include a non-transitory computer-readable medium storing instructions for rendering a video effect to a display. The instructions when executed by one or more processors of a computing device, cause the computing device to obtain video data and audio data, analyze the video data to determine one or more attachment points of a target object that appears in the video data, analyze the audio data to determine audio characteristics, determine a video effect associated with an animation to be added to the one or more attachment points based on the audio characteristics, and generate a rendered video by applying the video effect to the video data.

(C2) In some examples of C1, wherein to determine the video effect associated with animation to be added to the one or more attachment points based on the audio characteristics comprises to determine an animated object to be added to the one or more attachment points, determine the one or more attachment points in the video data where the animated object is to be attached, and one or more animation effects to be applied to the animated object based on the audio characteristics.

(C3) In some examples of C1-C2, wherein the one or more attachment points are selected from one or more body points of the target object that appears in the video data.

(C4) In some examples of C1-C3, wherein to determine the one or more attachment points in the video data comprises to determine one or more attachment points in the video data based on the audio characteristics.

(C5) In some examples of C1-C4, the instructions when executed by the one or more processors further cause the computing device to generate a three-dimensional (3D) mesh around the one or more attachment points and modify an animation sequence to blend the animated object in a corresponding 3D mesh around the one or more attachment points where the animated object is attached.

(C6) In some examples of C1-05, wherein the audio characteristics comprises beat characteristics of each beat or a frequency spectrum value for each beat.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for rendering a video effect to a display, the method comprising:
   obtaining video data and audio data;
   analyzing the video data to determine one or more attachment points of a target object that appears in the video data;
   analyzing the audio data to determine one or more audio characteristics of the audio data, wherein the one or more audio characteristics include at least one of (i) a beat characteristic of the audio data and (ii) a frequency spectrum characteristic of the audio data;
   determining the video effect associated with an animation to be added to the one or more attachment points based on the one or more audio characteristics; and
   generating a rendered video by applying the video effect to the video data.

2. The method of claim 1, wherein determining the video effect associated with the animation to be added to the one or more attachment points based on the one or more audio characteristics comprises:
   determining an animated object to be added to the one or more attachment points;
   determining the one or more attachment points in the video data where the animated object is to be attached; and
   determining one or more animation effects to be applied to the animated object based on the one or more audio characteristics.

3. The method of claim 2, wherein determining the one or more attachment points in the video data comprises determining one or more attachment points in the video data based on the one or more audio characteristics.

4. The method of claim 2, further comprising:
   generating a three-dimensional (3D) mesh around the one or more attachment points; and
   modifying an animation sequence to blend the animated object in a corresponding 3D mesh around the one or more attachment points where the animated object is attached.

5. The method of claim 1, wherein the one or more attachment points are selected from one or more body points of the target object that appears in the video data.

6. The method of claim 1, wherein obtaining the audio data comprises selecting the audio data from a music library, and wherein the one or more audio characteristics are embedded in the audio data as metadata.

7. A computing device for rendering a video effect to a display, the computing device comprising:
   a processor; and
   a memory having a plurality of instructions stored thereon that, when executed by the processor, causes the computing device to:
   obtain video data and audio data;
   analyze the video data to determine one or more attachment points of a target object that appears in the video data;
   analyze the audio data to determine one or more audio characteristics of the audio data, wherein the one or more audio characteristics include at least one of (i) a beat characteristic of the audio data and (ii) a frequency spectrum characteristic of the audio data;

determine the video effect associated with an animation to be added to the one or more attachment points based on the one or more audio characteristics; and generate a rendered video by applying the video effect to the video data.

8. The computing device of claim 7, wherein to determine the video effect associated with animation to be added to the one or more attachment points based on the one or more audio characteristics comprises to:

determine an animated object to be added to the one or more attachment points;

determine the one or more attachment points in the video data where the animated object is to be attached; and determine one or more animation effects to be applied to the animated object based on the one or more audio characteristics.

9. The computing device of claim 8, wherein to determine the one or more attachment points in the video data comprises to determine one or more attachment points in the video data based on the one or more audio characteristics.

10. The computing device of claim 9, wherein the plurality of instructions, when executed, further cause the computing device to:

generate a three-dimensional (3D) mesh around the one or more attachment points; and modify an animation sequence to blend the animated object in a corresponding 3D mesh around the one or more attachment points where the animated object is attached.

11. The computing device of claim 7, wherein the one or more attachment points are selected from one or more body points of the target object that appears in the video data.

12. The computing device of claim 7, wherein to obtain the audio data comprises to select the audio data from a music library, and wherein the one or more audio characteristics are embedded in the audio data as metadata.

13. A non-transitory computer-readable medium storing instructions for rendering a video effect to a display, the instructions when executed by one or more processors of a computing device, cause the computing device to:

obtain video data and audio data;

analyze the video data to determine one or more attachment points of a target object that appears in the video data;

analyze the audio data to determine one or more audio characteristics of the audio data, wherein the one or more audio characteristics include at least one of (i) a beat characteristic of the audio data and (ii) a frequency spectrum characteristic of the audio data;

determine the video effect associated with an animation to be added to the one or more attachment points based on the one or more audio characteristics; and generate a rendered video by applying the video effect to the video data.

14. The non-transitory computer-readable medium of claim 13, wherein to determine the video effect associated with animation to be added to the one or more attachment points based on the one or more audio characteristics comprises to:

determine an animated object to be added to the one or more attachment points;

determine the one or more attachment points in the video data where the animated object is to be attached; and one or more animation effects to be applied to the animated object based on the one or more audio characteristics.

15. The non-transitory computer-readable medium of claim 14, wherein to determine the one or more attachment points in the video data comprises to determine one or more attachment points in the video data based on the one or more audio characteristics.

16. The non-transitory computer-readable medium of claim 14, wherein the instructions when executed by the one or more processors further cause the computing device to:

generate a three-dimensional (3D) mesh around the one or more attachment points; and modify an animation sequence to blend the animated object in a corresponding 3D mesh around the one or more attachment points where the animated object is attached.

17. The non-transitory computer-readable medium of claim 13, wherein the one or more attachment points are selected from one or more body points of the target object that appears in the video data.

* * * * *